United States Patent Office 3,380,849
Patented Apr. 30, 1968

3,380,849
ALUMINA-ZIRCON CERAMIC COATINGS
AND BODIES
Harold Pollack, College Park, Md., assignor to E. I. du Pont de Nemours and Company, Wilmington, Del., a corporation of Delaware
No Drawing. Filed Apr. 17, 1964, Ser. No. 360,777
2 Claims. (Cl. 117—123)

This invention relates to improved refractory compositions containing zircon and methods for their preparation. It is more particularly concerned with the preparation of kiln furniture comprising alumina-zircon.

Kiln furniture such as rings, cranks, setters, saggers, and the like, need strength and refractory properties to support the load during firing, toughness to survive handling, thermal shock resistance to survive the firing-cooling cycles and chemical inertness especially when firing glazed china, ferroelectric ceramics, and the like, to prevent contamination of the product. In addition, the mass of such kiln furniture should be kept to a minimum in order to utilize the kilns more fully and reduce the cost of firing.

The combination of properties of commercially available kiln furniture has not been completely satisfactory. The mass has been excessive and the borderline refractoriness and marginal chemical inertness of the products has necessitated machining the setter components to the required shape between firings.

This invention provides shaped refractories characterized by flexural strengths of at least 2500 pounds per square inch (p.s.i.) [176 kilograms per square centimeter (kg./cm.$^2$)] at 25° C. and at least 1250 p.s.i. (88 kg./cm.$^2$) at 1200° C., a compressive strength of at least 16,000 p.s.i. (1125 kg./cm.$^2$), excellent resistance to thermal shock, excellent stability to reheating and an impervious, glaze-resistant outer surface.

In accordance with one embodiment of this invention, a mixture consisting essentially of tabular alumina, zircon and water is shaped and fired to a temperature of from 1400 to about 1500° C.

In another embodiment of the invention the wet mixture referred to above is coated on a refractory obtained by the in situ oxidation of aluminum and then fired.

The tabular alumina employed in this invention (defined in "Encyclopedia of Chemical Technology," vol. I, p. 641 (1947)) is a high fired alumina of high purity consisting of coarse, well developed alpha alumina crystals. Alcoa tabular alumina (made by the Aluminum Company of America, Pittsburgh, Pa.) is suitable. It generally shrinks less than about 10% during 1 hour at 1800° C. and has a bulk density in excess of 100 pounds per cubic foot. It must pass a 200-mesh and preferably a 325-mesh screen. It is present in the raw mix in the proportions of 40 to 60% by weight based on the dry solids in the raw mix.

Commercial grades of zircon, e.g., containing 95% or more zirconium silicate, are satisfactory. The zircon is usually supplied in a milled or crushed state and for use in this invention must be small enough to pass a 150-mesh screen. It is employed in amounts between about 60 and 40% by weight based on the dry solids in the raw mix.

The mixtures of alumina and zircon are most readily handled as aqueous slurries or pastes. Minor amounts of thickening agents and/or green binding agents such as carboxy methyl cellulose, polyvinyl alcohol, polysaccharides, glue, rubber, natural gums such as gum arabic and the like may be advantageously used in the process. Preferably a material is used that will burn out under the firing conditions. The use of from about 0.5 to about 2% of such additives is usually adequate.

The compositions of this invention whether as shaped structures or as coatings should be fired at about 1400° to about 1500° C. for a period of between about 2 and 10 hours.

Shapes of the alumina-zircon mixtures of homogenous composition are readily made by the conventional ceramic and refractory techniques such as pressure molding and slip casting. Molding pressures of from 2000 to 10,000 p.s.i. (141 to 705 kg./cm.$^2$) have been satisfactorily used to give bulk densities of the fired shapes of from about 2.6 to 3 g./cm.$^3$ Coatings of the alumina-zircon composites can be applied by spraying, brushing, dipping, etc. When applied to certain refractory substrates and fired, particularly useful results are obtained. These substrates, which may be in the form of kiln furniture, burner parts and glass tank refractories, are prepared by the in situ oxidation of aluminum particles in admixture with other ingredients, the latter depending on the properties desired in the final product. One firing mixture (Type A) that may be employed for the substrate consists essentially of from 6 to 50% (preferably about 10 to 40%) of aluminum particles passing through an 80-mesh sieve, about 94 to 50% of filler refractory selected from the class consisting of alumina bubbles, tabular alumina, carbides of aluminum, boron, silicon, titanium, and tungsten; the nitrides of aluminum, boron, titanium, uranium, and zirconium; and the borides of chromium, molybdenum, titanium, tungsten, and zirconium, and a fluxing agent in an amount of at least 0.2% based on the weight of aluminum.

When using aluminum and alumina in Type A compositions, the best results are obtained when at least half of the alumina is 4/100 mesh size and the remainder passes 100 mesh. With silicon carbide, best results are obtained when at least half of the silicon carbide passes 150 mesh and the remainder is 28/150 mesh.

Another firing mixture, Type B is made from 5 to 40% (preferably 7 to 30%) of aluminum particles of about 3.5/200 mesh, 10 to 46% (preferably 15 to 40%) of a plastic clay, between 1 and 10% by weight based on the clay of a fluxing agent and from 30 to 85% (preferably 52 to 77%) of tabular alumina of between 4 and —325 mesh size. At least 75% of the weight of the aluminum should be present as particles having one dimension of at least about 0.178 mm., a second dimension of at least 0.012 mm. and a third dimension between about 0.012 and 5 mm. For example, if spheres of aluminum are used, at least 75% of the weight of aluminum should comprise particles of 3.5/80 mesh size. The weight of alumina present as particles smaller than 200 mesh in combination with alumina from in situ oxidized aluminum and the alumina in the clay should be equal to or greater than the stoichiometric weight required to form mullite from the SiO$_2$ present in the clay.

Suitable fluxing agents are an oxide of a metal from the class consisting of the alkali metals, the alkaline earth metals, vanadium, chromium, molybdenum, tungsten, copper, silver, zinc, antimony, and bismuth, precursors of these oxides and hydroxides of the alkali metals. The oxides and hydroxides of the alkali metals, magnesium, strontium and barium are preferred.

By the expression "plastic clay" is meant a substance with a composition corresponding to that of an aluminosilicic acid usually containing other substances which become plastic (i.e., exhibits plastic flow) when mixed with the proper amount of water. The plastic clay provides the proper forming properties for the refractory mix, serves as a green binder and is a source of silica to form mullite.

Suitable clays may be found in such classes as ball clay, bonding clay, and the like which will be obvious to one skilled in the art.

The clay used should be selected or blended to give the desired ratio between silica and alumina in the final product. The suggested use of 10 to 40% clay is based on a silica content of from about 45 to 65% and an alumina content of from about 22 to 39%.

Either type of substrate firing mixture may be combined with water and green bonding agents (such as gum arabic, polysaccharides, glues and the like) as needed and shaped to bodies having a porosity of a least 20% after removal of volatile materials. The dried bodies are fired in an oxidizing atmosphere at a temperature between about 650° C., and the softening point of the composition for a period of time to oxidize at least 90% of the aluminum. The rate of heating should be controlled so that the temperature of the shaped mixture does not exceed the ambient temperature (in the kiln) by more than 100° C.

Testing procedures

All sieve measurements are made with Tyler Standard Screen Scale Sieves (W. S. Tyler Co., Cleveland, Ohio). By the expression "x/y mesh" is meant that all of the particles pass through an $x$ mesh sieve (also noted as "$-x$ mesh") and are retained on a $y$ mesh sieve.

Flexural strength is measured at the temperature noted according to ASTM Standard 1958, part 4, page 670, Test No. C293–577 with the use of a span width of 1 to 4 inches (2.54 to 10.16 cm.).

Compressive strength is measured on a 1 x 1 x 2 inch (2.54 x 2.54 x 5.08 cm.) sample at room temperature at a loading rate of 2000 pounds (910 kilograms) per minute.

Bulk density (or apparent density) is calculated from the weight of the specimen in air and its mass volume (including open and closed pores).

The products of this invention have special utility as kiln furniture, kiln linings, burner parts, glass tank refractories and sodium silicate furnace refractories.

Example 1

Refractory plates 1.5 x 0.75 x 0.5 inches (3.81 x 1.92 x 1.27 cm.) are made by molding a wet mixture of 24 parts of aluminum mill granules (30/100 mesh), 40 parts of tabular alumina (equal portions of 14/28 and —325 mesh), 36 parts of a plastic clay and 6 parts of water.

The molded plates are dried and fired at an even rate in air as follows: 200 to 800° C. in 23 hours, 800 to 1200° C. in 37 hours, 1200 to 1300° C. in 16 hours, 1300 to 1400° C. in 17 hours, and 1400 to 1580° C. in 37 hours.

The clay used is a bonding clay containing by analysis $Al_2O_3$ 57.3%, $SiO_2$ 28.5%, alkali metal oxides 1–5%, MgO 0.22%, CaO 0.08%, other impurities 3.5%, ignition loss 9.4%.

Mixtures of tabular alumina (—325 mesh), and milled zircon (containing a minimum of 96% zirconium silicate) and water are made as shown in Table I and applied to one face of the above refractory plates. The zircon had the following sieve analysis: on 150 mesh 0%, on 200 mesh 51%, on 250 mesh 22%, on 325 mesh 17%, on 400 mesh 4%, passing 400 mesh 6%.

TABLE I

| Item | $Al_2O_3$ | Zircon | Water |
|---|---|---|---|
| a | 60 | 40 | 30 |
| b | 50 | 50 | 25 |
| c | 40 | 60 | 25 |

The coated plates are fired for 4 hours at 1400° C. The cooled plates have a smooth, crack-free, adherent coating.

The coated plates and an original uncoated plate are tested for reactivity with PbO vapor. In this test, the plates are used as a cover for a crucible containing 2 grams of PbO that is heated at 1100° C. for 30 hours. The coated plates (Items a, b, and c above) are completely unaltered by this treatment. The uncoated plate is attacked and contaminated as shown by marked discoloration.

Example 2

Molding compositions are made of tabular alumina in —325 mesh, and 14/28 mesh sizes, the zircon of Example 1, and a 33% aqueous solution of gum arabic. The compositions are molded to 1 x 1 x 4 inch (2.54 x 2.54 x 10.16 cm.) plates at 4000 p.s.i. (282 kg./cm.$^2$), dried in air for 24 hours and then fired in air at the following rate: room temperature to 600° C. in 18 hours, 600 to 700° C. in 4 hours, and 700 to 1400° C. in 18 hours. Results are shown in Table II.

Items a, c, and e are examples of the process of this invention. They had a good appearance, white color and excellent properties with bulk densities from 170 to 176 lbs./ft.$^3$ (2.72 to 2.82 g./cm.$^3$).

Fired specimens prepared as a, c, and e are reheated to 600° C. in 1 hour, held for 72 hours and then heated to 1200° C. in 1.5 hours where they are held for 120 hours and then cooled slowly. Examination of the cold samples shows no significant changes in weight or dimensions as given below. The sample containing 40% alumina did develop slight cracks on the bottom.

| Item | Weight, grams | | Length, cm. | |
|---|---|---|---|---|
| | Original | After reheat | Original | After reheat |
| a | 74 | 74 | 4.78 | 4.77 |
| c | 65 | 65 | 4.77 | 4.77 |
| e | 76 | 75 | 4.88 | 4.86 |

Items b, d, and f are included for comparative purposes only to show the deleterious effects on strength of using coarse alumina in the composition.

Bars with dimensions and composition corresponding to a, c, and e are dried and fired as follows: room temperature to 600° C. in 18 hours, 600 to 700° C. in 4 hours and 700 to 1500° C. in 18 hours and furnace cooled. The physical properties for the bars (g, h, and i) are given in Table II. The higher firing produces crack-free bars with better physical properties than those fired to 1400° C. However, the bars fired to 1500° C. have a cream to yellow color indicating some disproportionation of the zircon.

Cranks for a setter assembly are made by the procedures for Item h above. The arms of the crank are cut off and heated to 1000° C. The arms are cooled by removing from the furnace and (1) cooling in stagnant air (2) by an air blast and (3) by quenching in water. No damage by this thermal shock is visible and samples cut from the rapidly cooled specimens have the same high flexural strength as the original unshocked samples.

TABLE II

| Item | Composition[1] Tabular Alumina −325 mesh | Composition[1] Tabular Alumina 14/28 mesh | Zircon | Flexural Strength 25° C. P.s.i. | Flexural Strength 25° C. Kg./cm.[2] | Flexural Strength 1,200° C.[2] P.s.i. | Flexural Strength 1,200° C.[2] Kg./cm.[2] | Compressive Strength P.s.i. | Compressive Strength Kg./cm.[2] |
|---|---|---|---|---|---|---|---|---|---|
| a | 60 | 0 | 40 | 3,020 | 212 | 1,520 | 107 | 16,750 | 1,178 |
| b | 30 | 30 | 40 | 1,365 | 96 | | | 9,770 | 686 |
| c | 50 | 0 | 50 | 3,195 | 225 | 2,090 | 147 | 18,250 | 1,285 |
| d | 25 | 25 | 50 | 1,575 | 110 | | | 11,580 | 815 |
| e | 40 | 0 | 60 | 3,850 | 271 | 2,600 | 183 | 17,200 | 1,210 |
| f | 20 | 20 | 60 | 2,070 | 146 | | | 11,500 | 809 |
| g | 60 | 0 | 40 | 4,000 | 281 | | | 19,000 | 1,336 |
| h | 50 | 0 | 50 | 3,520 | 247 | | | 20,650 | 1,452 |
| i | 40 | 0 | 60 | 4,475 | 315 | | | 22,600 | 1,590 |

[1] 6 parts of gum arabic solution in each composition.  [2] Averages of samples cut from edge and center of a bar.

Example 3

Refractory plates are made from aluminum, tabular alumina and clay as in Example 1. The fired plates are coated with an aqueous slurry containing equal amounts of 200-mesh zirconium silicate and tabular alumina (−325 mesh) the coating dried and then fired to 1400° C. and held there for 24 hours.

A piece of a green (unfired) ferrite shape (such as is used for electronic components) is placed on the coated plate and the plate placed in a furnace. The furnace is heated to 1200° C. in 18 hours and then allowed to cool. The fired ferrite does not stick to the plate. The coating on the plate is only slightly discolored and is not otherwise changed.

Bars molded from the coating composition and fired at 1400° C. for 24 hours have a flexural strength at 25° C. of 9260 p.s.i. (675 kg./cm.$^2$).

What is claimed is:

1. A method for protectively coating a ceramic substrate comprising applying to the substrate a mixture of tabular alumina of −200 mesh, zircon of −150 mesh and water, the tabular alumina constituting from between 40 and 60% by weight of the solids and the zircon constituting from between 60 and 40% by weight of the solids, and firing the coated substrate at about 1400 to 1500° C.

2. The method of claim 1 wherein the substrate is prepared by the in situ oxidation of at least 90% of the aluminum in a mixture containing from 5 to 40% of aluminum particles of about 3.5/200 mesh, 10 to 46% of a plastic clay, 1 to 10% by weight based on the clay of a fluxing agent and from 30 to 85% of tabular alumina of 4/325 mesh.

References Cited

UNITED STATES PATENTS 2,842,447   7/1958   Schlotzhauer et al. ____ 106—57

TOBIAS E. LEVOW, *Primary Examiner.*

JAMES E. POER, *Examiner.*